(12) United States Patent
Okumura et al.

(10) Patent No.: US 12,214,558 B2
(45) Date of Patent: Feb. 4, 2025

(54) CORE AND METHOD OF FORMING STRUCTURAL BODY

(71) Applicant: Kawasaki Jukogyo Kabushiki Kaisha, Kobe (JP)

(72) Inventors: Kenshirou Okumura, Kobe (JP); Takaya Hamamoto, Kobe (JP); Toshikazu Sana, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 121 days.

(21) Appl. No.: 17/964,095

(22) Filed: Oct. 12, 2022

(65) Prior Publication Data

US 2023/0029898 A1    Feb. 2, 2023

Related U.S. Application Data

(63) Continuation of application No. PCT/JP2021/015316, filed on Apr. 13, 2021.

(Continued)

(51) Int. Cl.
*B29C 33/76* (2006.01)
*B29C 33/48* (2006.01)
*B29C 70/30* (2006.01)
*B29C 70/46* (2006.01)
*B29C 70/54* (2006.01)

(Continued)

(52) U.S. Cl.
CPC .............. *B29C 70/30* (2013.01); *B29C 33/76* (2013.01); *B29C 70/462* (2013.01); *B29C 70/54* (2013.01); *B29C 33/485* (2013.01); *B29K 2305/12* (2013.01); *B29K 2307/04* (2013.01); *B29L 2031/3076* (2013.01); *B29L 2031/3082* (2013.01); *B32B 5/02* (2013.01); *B32B 5/26* (2013.01); *B32B 2260/023* (2013.01); *B32B 2260/046* (2013.01); *B32B 2262/106* (2013.01)

(58) Field of Classification Search
CPC ....... B29C 33/48; B29C 33/485; B29C 33/50; B29C 33/505
See application file for complete search history.

(56) References Cited

U.S. PATENT DOCUMENTS 875,097 A * 12/1907 McKee .................. B22C 9/101
  249/186
1,371,525 A * 3/1921 Strausbaugh ......... E04G 15/063
  249/185

(Continued)

FOREIGN PATENT DOCUMENTS

JP    2015-142993 A    8/2015

*Primary Examiner* — Matthew J Daniels
(74) *Attorney, Agent, or Firm* — XSENSUS LLP (57) ABSTRACT

A core according to one aspect of the present disclosure is a core that is inserted into a space between a skin and a stringer in a step of integrally molding the skin and the stringer, the skin including fiber-reinforced resin, the stringer having a hat-shaped section that is open toward the skin. The core includes: a first die that extends along a longitudinal direction of the stringer and contacts the skin; a second die that extends along the longitudinal direction of the stringer, is adjacent to the first die, and contacts the skin; and a third die that extends along the longitudinal direction of the stringer, is located at an opposite side of the skin across the first die and the second die, and contacts both the first die and the second die.

15 Claims, 5 Drawing Sheets

Related U.S. Application Data (60) Provisional application No. 63/009,149, filed on Apr. 13, 2020.

(51) Int. Cl.
  *B29K 305/12* (2006.01)
  *B29K 307/04* (2006.01)
  *B29L 31/30* (2006.01)
  *B32B 5/02* (2006.01)
  *B32B 5/26* (2006.01)

(56) References Cited

U.S. PATENT DOCUMENTS

| | | | | |
|---|---|---|---|---|
| 1,394,558 A | * | 10/1921 | Klug | B29D 99/006 147/48 |
| 2,442,516 A | * | 6/1948 | Shriver | B29C 43/36 425/DIG. 14 |
| 2,445,290 A | * | 7/1948 | Gonda | E04C 2/16 156/304.6 |
| 2,682,294 A | * | 6/1954 | Langer | B29C 66/81881 156/583.2 |
| 2,818,618 A | * | 1/1958 | Winship | B22C 9/101 242/573 |
| 5,387,098 A | * | 2/1995 | Willden | B29C 33/50 264/313 |
| 8,778,117 B2 | | 7/2014 | Dorawa et al. | |
| 2005/0230552 A1 | * | 10/2005 | Engwall | B29D 99/0014 244/133 |
| 2010/0102482 A1 | * | 4/2010 | Jones | B29C 43/58 264/320 |
| 2012/0097323 A1 | * | 4/2012 | Nitsch | B29C 70/30 156/212 |
| 2013/0181374 A1 | * | 7/2013 | Ender | B29C 33/44 264/258 |
| 2015/0298401 A1 | * | 10/2015 | Hoffmeister | B29C 70/462 156/535 |
| 2016/0332395 A1 | | 11/2016 | Abe et al. | |
| 2018/0207840 A1 | | 7/2018 | Register | |
| 2019/0118924 A1 | * | 4/2019 | Webb | B32B 5/02 |

\* cited by examiner

CORE AND METHOD OF FORMING STRUCTURAL BODY

CROSS-REFERENCE TO RELATED APPLICATIONS

The present application is a bypass continuation of PCT Filing PCT/JP2021/015316, filed Apr. 13, 2021, which claims priority to U.S. 63/009,149, filed Apr. 13, 2020, both of which are incorporated by reference in their entirety.

BACKGROUND OF THE INVENTION

1. Field of the Invention

The present disclosure relates to a core used in a step of forming a structural body including fiber-reinforced resin and a method of forming the structural body by using the core.

2. Description of the Related Art

A structural body formed by integrally molding a skin made of fiber-reinforced resin and a beam-shaped stringer has been devised. As the stringer, a stringer having a hat-shaped section that is open toward the skin can be used. The stringer having the hat-shaped section is advantageous in that this stringer easily follows a change in the section of the structural body and has high strength for its weight. However, in the step of integrally molding the skin and the stringer having the hat-shaped section, a core needs to be inserted in a space between the skin and the stringer (see Japanese Laid-Open Patent Application Publication No. 2015-142993, for example).

SUMMARY OF THE INVENTION

A core according to one aspect of the present disclosure is a core that is inserted into a space between a skin and a stringer in a step of integrally molding the skin and the stringer, the skin including fiber-reinforced resin, the stringer having a hat-shaped section that is open toward the skin. The core includes: a first die that extends along a longitudinal direction of the stringer and contacts the skin; a second die that extends along the longitudinal direction of the stringer, is adjacent to the first die, and contacts the skin; and a third die that extends along the longitudinal direction of the stringer, is located at an opposite side of the skin across the first die and the second die, and contacts both the first die and the second die.

A method of forming a structural body according to one aspect of the present disclosure includes: inserting the core into the space between the skin and the stringer; in this state, integrally molding the skin and the stringer; and then, pulling out the core from the space.

DESCRIPTION OF THE PREFERRED EMBODIMENTS

Embodiment 1

First, a core 100 according to Embodiment 1 will be described.

Structural Body

Figure 1:
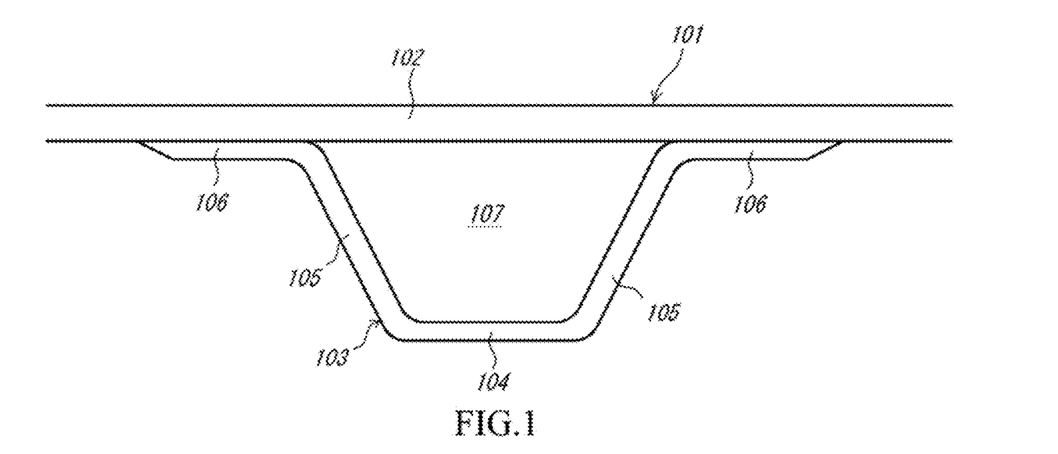
FIG. 1 is a front view of a structural body formed by using a core.

First, a structural body 101 formed by using the core 100 will be described. FIG. 1 is a front view of the structural body 101 and shows apart of the structural body 101. As one example, the structural body 101 is an airframe of an aircraft. The structural body 101 includes a skin 102 and stringers 103. FIG. 1 shows one of the stringers 103. The shape of the structural body 101 is not limited and may be a flat plate shape or a cylindrical shape.

The skin 102 is a portion corresponding to a surface of the structural body 101. In the present embodiment, the thickness of the skin 102 is constant. The skin 102 is formed in such a manner that: sheet-shaped prepregs are prepared by impregnating fibers, such as carbon, with resin; and the prepregs are laminated on each other and are cured. To be specific, the skin 102 is made of fiber-reinforced resin. The thickness of the skin 102 can be adjusted by the number of prepregs laminated. The resin of the skin 102 of the present embodiment is thermoplastic resin but may be thermosetting resin.

The stringer 103 is a portion which is located inside the skin 102 and formed integrally with the skin 102. The stringer 103 serves as a beam and extends in a predetermined direction (direction perpendicular to a paper surface of FIG. 1). When the structural body 101 has a tubular shape, the stringer 103 extends along an axial direction of the structural body 101. The stringer 103 of the present embodiment is made of the same material (i.e., the fiber-reinforced resin) as the skin 102. However, the stringer 103 may be made of a different material from the skin 102. For example, the stringer 103 may be made of an invar alloy.

Hereinafter, a direction in which the stringer 103 extends is referred to as a "longitudinal direction," and a section perpendicular to the longitudinal direction is simply referred to as a "section." A direction in which the skin 102 extends in a sectional view is referred to as a "width direction," and a direction along a perpendicular line of the skin 102 in the sectional view is referred to as a "perpendicular direction." In some cases, the perpendicular direction does not coincide with a vertical direction.

The stringer 103 has a hat-shaped section that is open toward the skin 102. Specifically, the stringer 103 includes a bottom surface portion 104, two side surface portions 105, and two flange portions 106. The bottom surface portion 104 is located farthest from the skin 102. The two side surface portions 105 extend from both width direction ends of the bottom surface portion 104 toward the skin 102. The two flange portions 106 extend from the respective side surface portions 105 outward in the width direction while contacting the skin 102. The two side surface portions 105 are inclined relative to the perpendicular direction so as to extend away from each other in the width direction.

Since the skin 102 and the stringer 103 are as above, a space 107 is between the skin 102 and the stringer 103. The space 107 extends in the longitudinal direction and has a trapezoidal shape in the sectional view. In a step of integrally molding the skin 102 and the stringer 103, the core 100 is inserted into the space 107.

Step of Forming Structural Body

Next, a step of forming the above structural body 101, i.e., the step of integrally molding the skin 102 and the stringer 103 will be described. FIGS. 2A to 2G are diagrams showing the step of forming the structural body 101. The below-described step of forming the structural body 101 is one example in which the skin 102 is made of thermoplastic resin. For example, when the skin 102 is made of thermosetting resin, a different step is performed.

Figure 2A:
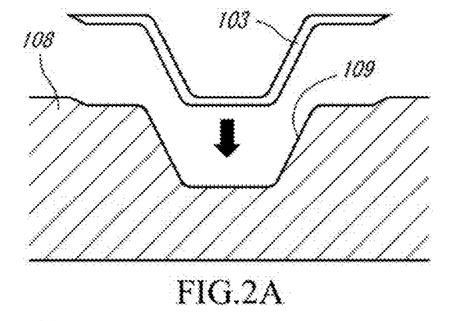
FIGS. 2A to 2G are diagrams showing a step of forming the structural body.
Figure 2B:
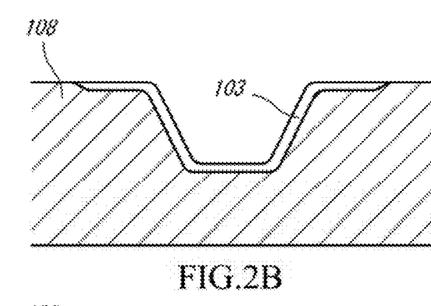
Figure 2C:
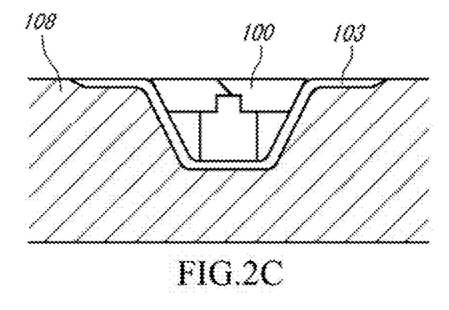

In the forming step of the present embodiment, first, as shown in FIGS. 2A and 2B, the stringer 103 is placed in a groove 109 of a base die 108 prepared in advance. The base die 108 has a shape corresponding to the shape of the completed structural body 101. For example, the base die 108 has a plate shape or a semi-circular section. Next, as shown in FIG. 2C, the core 100 is inserted into the stringer 103. Details of the core 100 will be described later.

Figure 2D:
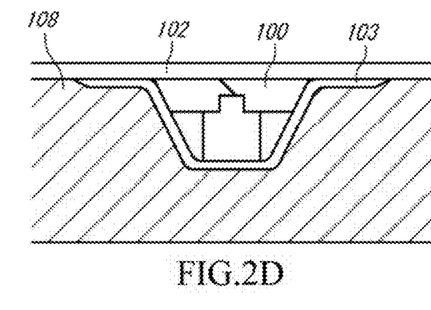

Next, as shown in FIG. 2D, the skin 102 is formed along the surface of the base die 108 and the surface of the core 100. As described above, the skin 102 is formed by laminating the prepregs. At this time, the skin 102 is not yet cured and is not yet joined to the stringer 103.

Figure 2E:
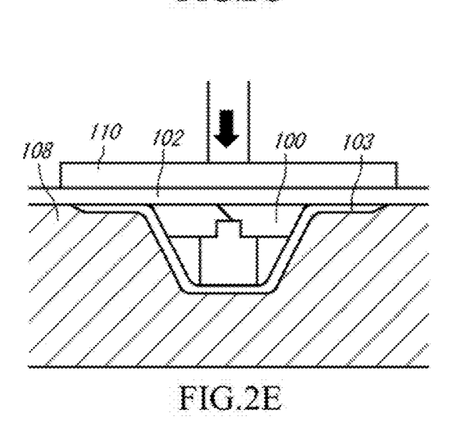

Next, as shown in FIG. 2E, heat is applied to the skin 102, and force is applied to the surface of the skin 102 with a pressurizer 110. At this time, the force is partially applied to the skin 102. Moreover, the temperature of the skin 102 becomes a high temperature, such as 350° C. As above, when the skin 102 is pressurized while being heated, the skin 102 is cured and joined to the stringer 103. To be specific, the skin 102 and the stringer 103 are integrally molded.

Figure 2F:
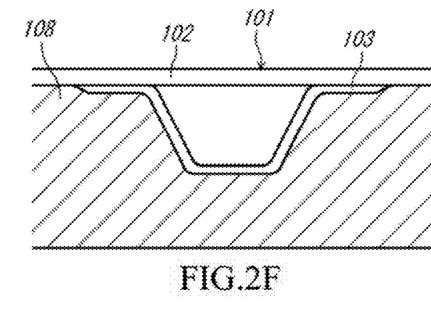
Figure 2G:
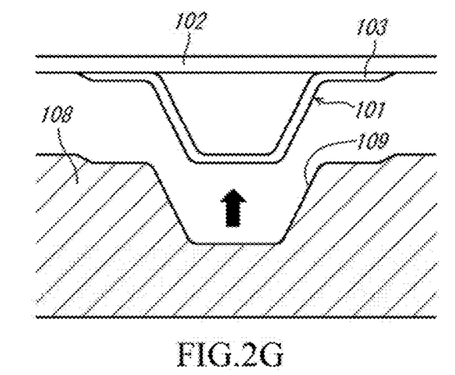

Next, as shown in FIG. 2F, the core 100 is pulled out from the space 107 between the skin 102 and the stringer 103. Finally, as shown in FIG. 2G, the structural body 101 in which the skin 102 and the stringer 103 are integrated with each other is taken out from the base die 108. This is the step of forming the structural body 101.

Core

Figure 3A:
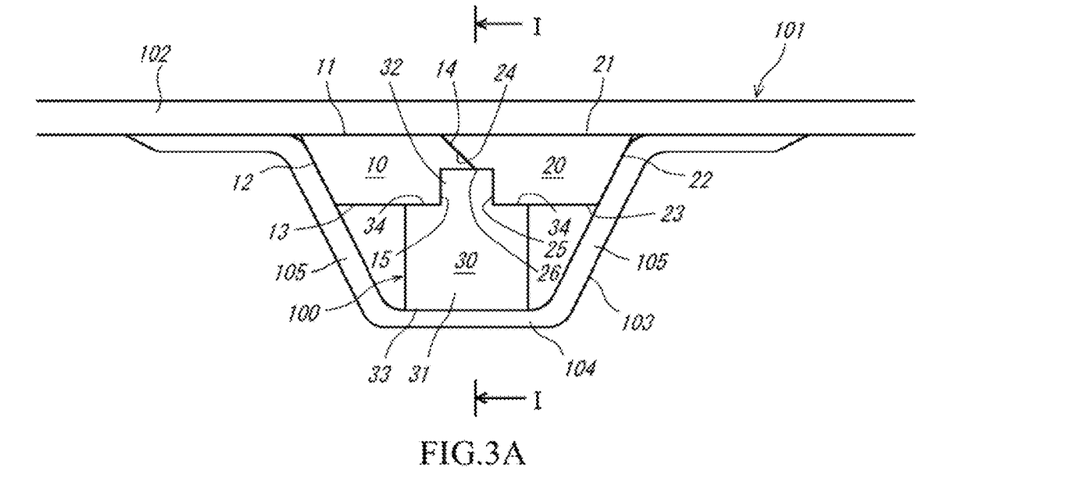
FIGS. 3A to 3C are respectively a front view of the core according to Embodiment 1, a sectional view taken along line I-I, and a rear view of the core according to Embodiment 1.
Figure 3B:
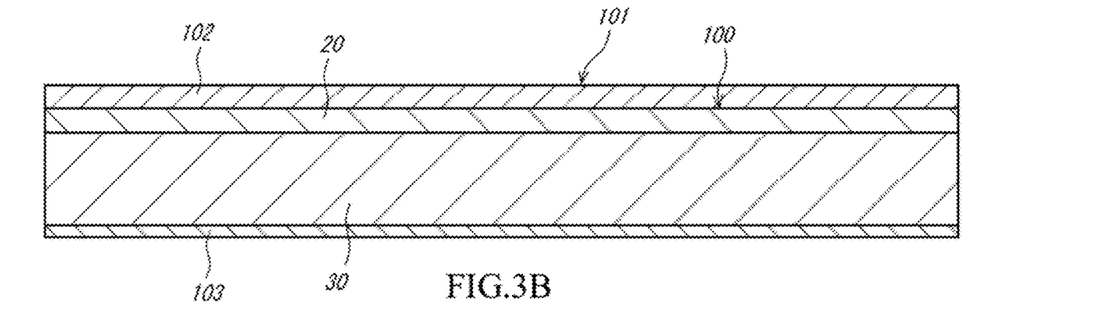
Figure 3C:
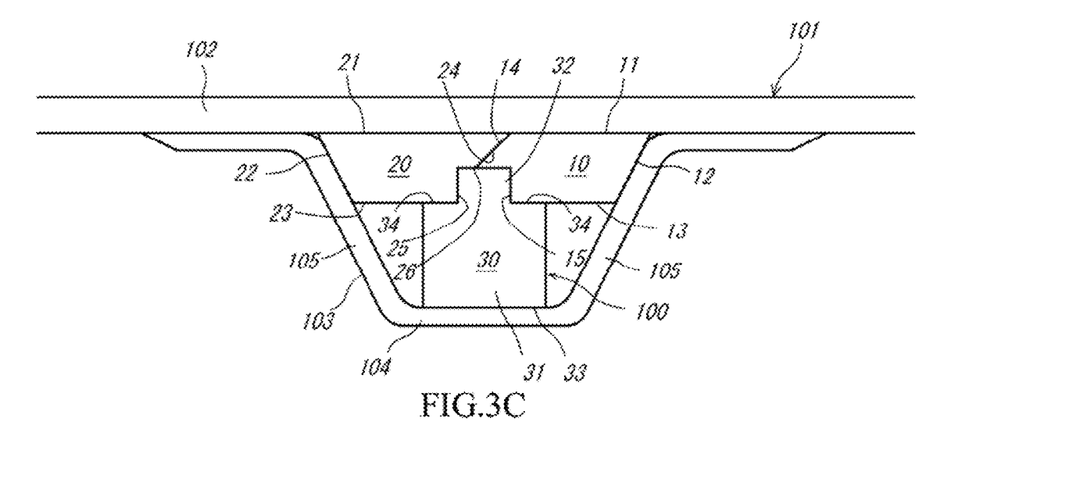

Next, the core 100 according to the present embodiment will be described. FIG. 3A is a front view of the core 100. FIG. 3B is a sectional view taken along line 1-1 of FIG. 3A. FIG. 3C is a rear view of the core 100. FIGS. 3A to 3C show that the core 100 is in the space 107 between the skin 102 and the stringer 103. The same is true in FIGS. 4A to 4C and FIGS. 5A to 5C described later.

As shown in FIG. 3A, the core 100 according to the present embodiment includes a first die 10, a second die 20, and a third die 30 which are separable from each other.

The first die 10 is a die that contacts the skin 102. The first die 10 is located side by side with the second die 20 in the width direction and extends along the longitudinal direction. The first die 10 of the present embodiment has the same sectional shape regardless of the position in the longitudinal direction.

More specifically, the first die 10 of the present embodiment includes: an upper surface 11 that contacts the skin 102; an outside surface 12 that contacts the side surface portion 105 of the stringer 103; a lower surface 13 that is located at an opposite side of the upper surface 11 and contacts the third die 30; an inside surface 14 that contacts the second die 20; and a recessed surface 15 that is located between the lower surface 13 and the inside surface 14, contacts the third die 30, and has an L-shaped section.

The second die 20 is a die that contacts the skin 102 as with the first die 10. The second die 20 is located side by side with the first die 10 in the width direction and extends along the longitudinal direction. The second die 20 of the present embodiment has the same sectional shape regardless of the position in the longitudinal direction.

More specifically, the second die 20 of the present embodiment includes: an upper surface 21 that contacts the skin 102; an outside surface 22 that contacts the side surface portion 105 of the stringer 103; a lower surface 23 that is located at an opposite side of the upper surface 21 and contacts the third die 30; an inside surface 24 that contacts the first die 10; and a recessed surface 25 that is located between the lower surface 23 and the inside surface 24, contacts the third die 30, and has an L-shaped section.

Moreover, the recessed surface 25 of the second die 20 forms an insertion groove 26 together with the recessed surface 15 of the first die 10. The insertion groove 26 is located at a boundary between the first die 10 and the second die 20 and extends in the longitudinal direction. In addition, the insertion groove 26 has a rectangular shape in the sectional view.

Furthermore, the inside surface 14 of the first die 10 and the inside surface 24 of the second die 20 contact each other and are inclined relative to the perpendicular direction. Specifically, the inside surface 14 of the first die 10 is inclined such that an angle between the inside surface 14 and the upper surface 11 is an obtuse angle in the sectional view. Moreover, the inside surface 24 of the second die 20 is inclined such that an angle between the inside surface 24 and the upper surface 21 is an acute angle in the sectional view.

The third die 30 is a die that is located at an opposite side of the skin 102 across the first die 10 and the second die 20. The third die 30 extends along the longitudinal direction. The third die 30 of the present embodiment has the same sectional shape regardless of the position in the longitudinal direction. More specifically, the third die 30 includes a main body 31 and a protrusion 32.

The main body 31 has a rectangular shape in the sectional view. A lower surface 33 of the main body 31 contacts the bottom surface portion 104 of the stringer 103. Shoulder surfaces 34 located at both sides of the protrusion 32 of the main body 31 in the width direction contact the lower surface 13 of the first die 10 and the lower surface 23 of the second die 20. As above, the main body 31 of the present embodiment has a rectangular shape in the sectional view. However, the main body 31 may have a trapezoidal shape corresponding to the sectional shape of the stringer 103.

The protrusion 32 is a portion projecting from a width direction middle of the third die 30 toward the skin 102. The protrusion 32 has a rectangular shape in a sectional view and is in the insertion groove 26 formed integrally by the recessed surface 15 of the first die 10 and the recessed surface 25 of the second die 20. Therefore, the protrusion 32 contacts both the recessed surface 15 of the first die 10 and the recessed surface 25 of the second die 20.

The dies 10, 20, and 30 of the core 100 are formed as above. Therefore, the first die 10 and the second die 20 are supported by the side surface portions 105 of the stringer 103 and the third die 30. As a result, the core 100 can withstand the force applied in the perpendicular direction through the skin 102 without collapsing as a whole.

Both the first die 10 and the second die 20 are supported by the third die 30. If the first die 10 and the second die 20 are not supported by the third die 30, the first die 10 and the second die 20 collapse. Therefore, in the work (work in FIGS. 2E and 2F) of pulling out the core 100 during the step of integrally molding the skin 102 and the stringer 103, the third die 30 is first pulled out, and with this, the first die 10 and the second die 20 collapse and can be easily pulled out.

In addition, in the present embodiment, the boundary between the first die 10 and the second die 20 is inclined relative to the perpendicular direction in the sectional view. Therefore, when the third die 30 is pulled out, the first die 10 falls first, and at this time, the first die 10 and the second die 20 do not get stuck. On this account, the first die 10 and the second die 20 further easily collapse.

The dies 10, 20, and 30 need to be made of a material that can withstand the heat applied in the step of forming the structural body 101. Moreover, it is desirable that the surfaces of the dies 10, 20, and 30 be smooth such that the friction of the dies 10, 20, and 30 with the skin 102 and the stringer 103 when the dies 10, 20, and 30 are pulled out does not become large. Based on these, the dies 10, 20, and 30 may be made of metal. Furthermore, in consideration of the manufacturing cost, the dies 10, 20, and 30 may be made of aluminum.

Embodiment 2

Figure 4A:
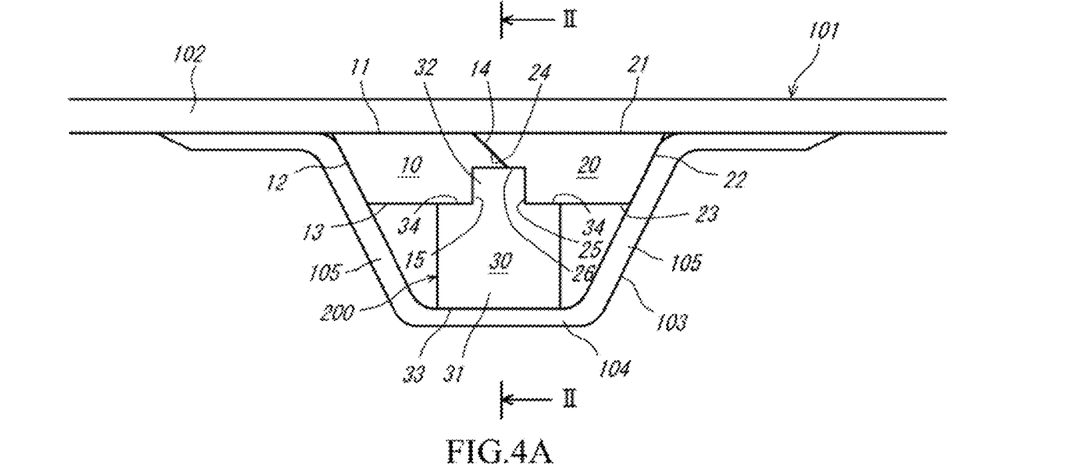
FIGS. 4A to 4C are respectively a front view of the core according to Embodiment 2, a sectional view taken along line II-II, and a rear view of the core according to Embodiment 2.
Figure 4B:
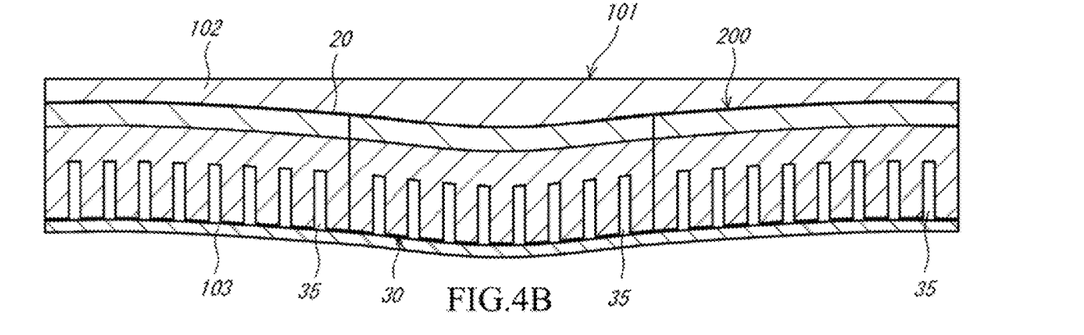
Figure 4C:
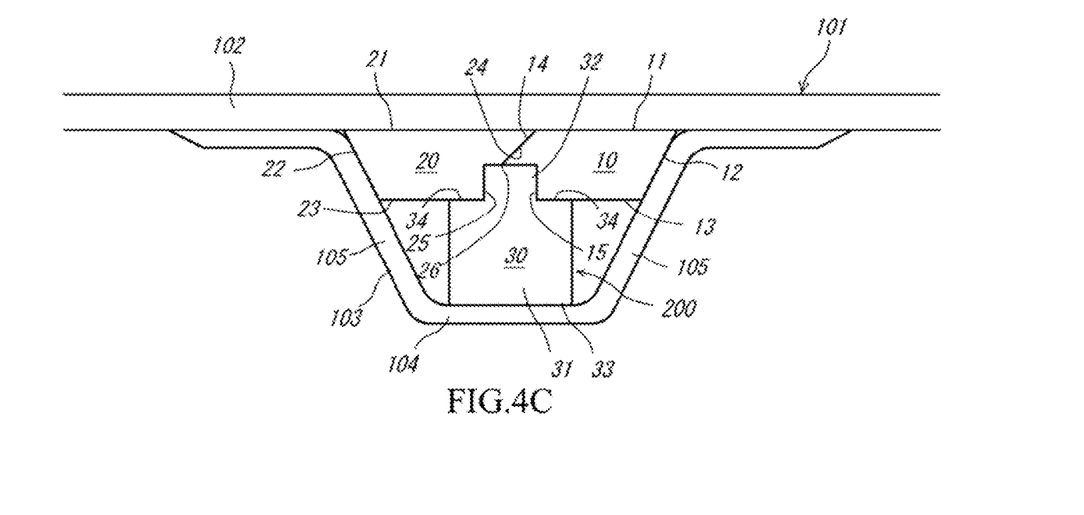

Next, a core 200 according to Embodiment 2 will be described. FIG. 4A is a front view of the core 200. FIG. 4B is a sectional view taken along line II-II of FIG. 4A. FIG. 4C is a rear view of the core 200. Among the components of the core 200 according to the present embodiment, the same reference signs are used for the same or corresponding components as the core 100 according to Embodiment 1, and the repetition of the same explanation is avoided.

As shown in FIG. 4B, in the present embodiment, the thickness of the skin 102 is not constant but varies depending on the position in the longitudinal direction. As a result, the space 107 between the skin 102 and the stringer 103 is displaced as it extends in the longitudinal direction. The core 200 according to the present embodiment can be utilized for the forming of the structural body 101.

First, in the core 200 according to the present embodiment, each of the first die 10, the second die 20, and the third die 30 is divided in the longitudinal direction. In the example shown in FIG. 4B, each of the dies 10, 20, and 30 is divided into three portions in the longitudinal direction. However, the number of divided portions of each of the dies 10, 20, and 30 is not limited to this. Since each of the dies 10, 20, and 30 is divided in the longitudinal direction, the divided portions can be displaced relative to each other. As a result, the core 200 according to the present embodiment easily follows the displacement of the space 107 between the skin 102 and the stringer 103 and is easily pulled out.

Moreover, the third die 30 of the core 200 according to the present embodiment includes slits 35 perpendicular to the longitudinal direction. With this, portions of the third die 30 which are adjacent to each other across the slit 35 can be displaced relative to each other. As a result, the core 200 according to the present embodiment easily follows the displacement of the space 107 between the skin 102 and the stringer 103 and is easily pulled out. The number of slits 35 of the third die 30 is not limited.

In the present embodiment, the slit 35 is open on the lower surface 33 of the third die 30 and extends from the lower surface 33 toward the skin 102. However, the slit 35 may be open on an upper surface of the third die 30 and extend toward the bottom surface portion 104 of the stringer 103.

Moreover, in the present embodiment, the third die 30 includes the slits 35. In addition, the first die 10 and the second die 20 may include slits. Furthermore, a dimension of the slit 35 in the perpendicular direction is not limited, and may be, for example, 50% or more of a dimension of the third die 30 in the perpendicular direction.

Embodiment 3

Figure 5A:
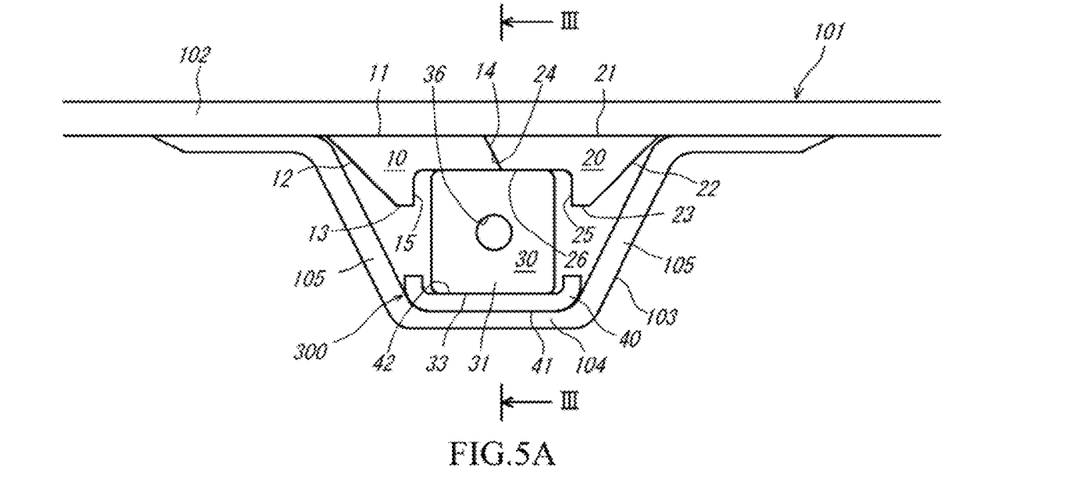
FIGS. 5A to 5C are respectively a front view of the core according to Embodiment 3, a sectional view taken along line III-III, and a rear view of the core according to Embodiment 3.
Figure 5B:
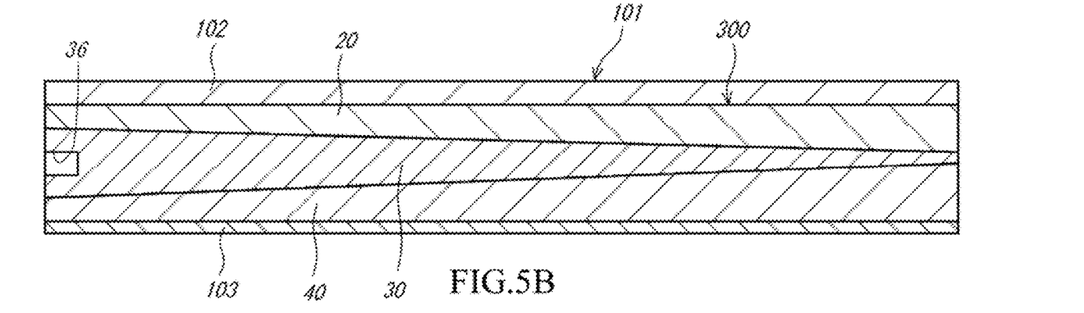
Figure 5C:
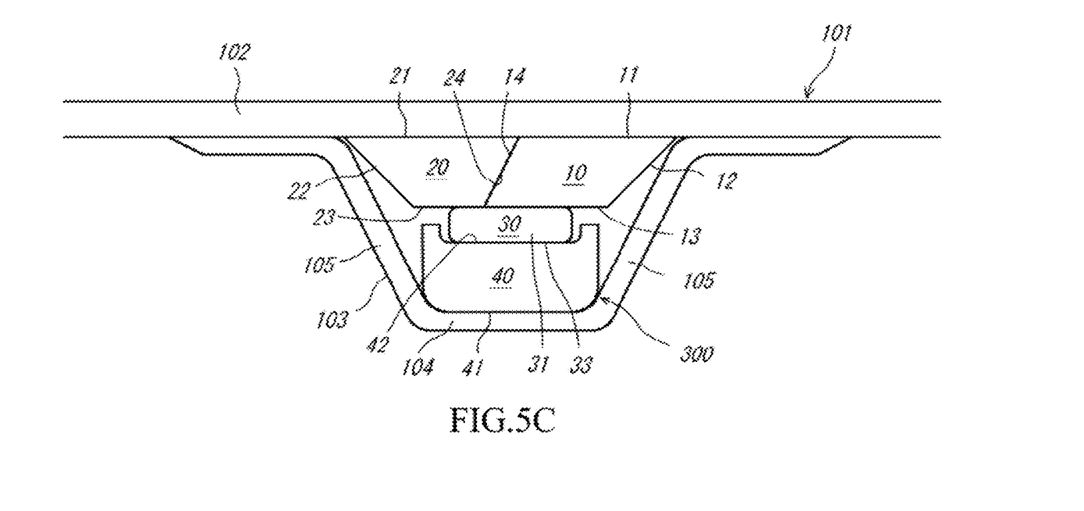

Next, a core 300 according to Embodiment 3 will be described. FIG. 5A is a front view of the core 300. FIG. 5B is a sectional view taken along line III-III of FIG. 5A. FIG. 5C is a rear view of the core 300. Among the components of the core 300 according to the present embodiment, the reference signs are used for the same or corresponding components as the core 10x) according to Embodiment 1, and the repetition of the same explanation is avoided.

As shown in FIG. 5A, the core 300 according to the present embodiment includes a fourth die 40 in addition to the first die 10, the second die 20, and the third die 30.

The third die 30 of the present embodiment includes the main body 31 but does not include the protrusion 32 (see FIG. 3A), and has a rectangular shape as a whole in the sectional view. A front end surface of the third die 30 includes an internal thread 36. When pulling out the third die 30, a jig may be attached to the internal thread 36, and the third die 30 may be pulled out through the attached jig.

Moreover, the insertion groove 26 in the present embodiment is formed integrally by the recessed surface 15 of the first die 10 and the recessed surface 25 of the second die 20, and a dimension of the insertion groove 26 in the width direction in the present embodiment is larger than a dimension of the insertion groove 26 in the width direction in Embodiment 1. Therefore, the third die 30 (main body 31) can be inserted into the insertion groove 26 of the present embodiment.

The fourth die 40 extends along the longitudinal direction and is located at an opposite side of the first die 10 and the second die 20 across the third die 30. A lower surface 41 of the fourth die 40 contacts the bottom surface portion 104 of the stringer 103, and an upper surface of the fourth die 40 includes a receiving groove 42 that receives the third die 30.

As shown in FIG. 5B, a dimension of the third die 30 in the perpendicular direction decreases as the third die 30 extends from a front side toward a rear side (from the left side toward the right side on a paper surface of FIG. 5B). Therefore, as is clear from comparison between FIG. 5A and FIG. 5C, the sectional area of the third die 30 decreases as the third die 30 extends from the front side toward the rear side in the longitudinal direction. To be specific, the third die 30 has a wedge shape. Therefore, according to the present embodiment, by pulling the third die 30 from the front side, the third die 30 can be easily pulled out.

In the present embodiment, a depth of the insertion groove 26 (a dimension of the insertion groove 26 in the perpendicular direction) decreases as the insertion groove 26 extends from the front side toward the rear side in the longitudinal direction. A dimension of the fourth die 40 in the perpendicular direction and the sectional area of the fourth die 40 increases as the fourth die 40 extends from the front side toward the rear side in the longitudinal direction. By the first die 10, the second die 20, and the fourth die 40 described as above, a center position of the third die 30 hardly changes although the sectional area of the third die 30 changes. As a result, the third die 30 can be linearly pulled out along the longitudinal direction.

CONCLUSION

As above, the core according to each of Embodiments 1 to 3 is a core that is inserted into a space between a skin and a stringer in a step of integrally molding the skin and the stringer, the skin including fiber-reinforced resin, the stringer having a hat-shaped section that is open toward the skin. The core includes: a first die that extends along a longitudinal direction of the stringer and contacts the skin; a second die that extends along the longitudinal direction of the stringer, is adjacent to the first die, and contacts the skin: and a third die that extends along the longitudinal direction of the stringer, is located at an opposite side of the skin across the first die and the second die, and contacts both the first die and the second die.

According to this configuration, even when the core is made of a relatively hard material such that a surface of the core which contacts the skin is prevented from being partially deformed, the third die located at a lower side is pulled out, and therefore, the first die and the second die collapse. Thus, the first die and the second die are easily pulled out.

Moreover, in the core according to each of Embodiments 1 to 3, in a sectional view perpendicular to the longitudinal direction of the stringer, a boundary between the first die and the second die is inclined relative to a direction along a perpendicular line of the skin.

According to this configuration, when the third die is pulled out, the first die or the second die falls first, and at this time, the first die and the second die collapse without getting stuck. Therefore, the first die and the second die are further easily pulled out.

Moreover, in the core according to Embodiment 2, each of the first die, the second die, and the third die is divided in the longitudinal direction.

According to this configuration, since the divided portions in the longitudinal direction can be displaced relative to each other, the core can easily follow the displacement of the space between the skin and the stringer and can be easily pulled out.

Moreover, in the core according to Embodiment 2, the third die includes a slit perpendicular to the longitudinal direction of the stringer.

According to this configuration, since portions of the third die which are adjacent to each other across the slit can be displaced relative to each other, the core can easily follow the displacement of the space between the skin and the stringer and can be easily pulled out.

Moreover, in the core according to Embodiment 3, a sectional area of the third die decreases as the third die extends from one side toward the other side in the longitudinal direction.

According to this configuration, by pulling the third die toward the one side, the third die can be easily pulled out.

Moreover, the core according to Embodiment 3 further includes a fourth die that extends along the longitudinal direction of the stringer and is located at an opposite side of the first die and the second die across the third die.

According to this configuration, by adjusting the shapes of the first die, the second die, and the fourth die, the center position of the third die can be maintained constant regardless of the position in the longitudinal direction. Therefore, the third die can be linearly pulled out along the longitudinal direction.

Moreover, the method of forming the structural body according to each of Embodiments 1 to 3 includes: inserting the core according to any one of claims 1 to 6 into the space between the skin and the stringer; in this state, integrally molding the skin and the stringer; and then, pulling out the core from the space.

According to this forming method, even when the core is made of a relatively hard material such that a surface of the core which contacts the skin is prevented from being partially deformed, the third die located at a lower side is pulled out, and therefore, the first die and the second die collapse. Thus, the first die and the second die are easily pulled out.

From the foregoing description, numerous modifications and other embodiments of the present disclosure are obvious to those skilled in the art. Accordingly, the foregoing description is to be construed as illustrative only, and is provided for the purpose of teaching those skilled in the art the best mode for carrying out the present disclosure. The structural and/or functional details may be substantially modified without departing from the scope of the present disclosure.

What is claimed is:

1. A core that is to be inserted into a space between a skin and a stringer in a step of integrally molding the skin and the stringer, the skin including fiber-reinforced resin, the stringer having a hat-shaped section that is open toward the skin,
    the core comprising:
    a first die that extends along a longitudinal direction of the stringer and contacts the skin;
    a second die that extends along the longitudinal direction of the stringer, is adjacent to the first die, and contacts the skin; and
    a third die that extends along the longitudinal direction of the stringer, is located at an opposite side of the skin across the first die and the second die, and contacts both the first die and the second die,
    wherein:
    in a sectional view perpendicular to the longitudinal direction of the stringer, a boundary between the first die and the second die is inclined relative to a direction along a perpendicular line of the skin,
    the third die includes a main body having a rectangular shape in the sectional view,
    contact between the first die and the third die is parallel to the skin,
    contact between the second die and the third die is parallel to the skin, and
    each of the first die, the second die, and the third die is divided in the longitudinal direction.

2. The core according to claim 1, wherein the third die includes a slit perpendicular to the longitudinal direction of the stringer.

3. The core according to claim 1, wherein a sectional area of the third die decreases as the third die extends from one side toward the other side in the longitudinal direction.

4. The core according to claim 3, further comprising a fourth die that extends along the longitudinal direction of the stringer and is located at an opposite side of the first die and the second die across the third die.

5. The core according to claim 1, wherein:
    the first die, the second die, and the third die are unbonded to one another.

6. The core according to claim 1, wherein:
    the first die includes two surfaces that are parallel to the skin which is adjacent to the first die and are different distances from the skin.

7. The core according to claim 6, wherein:
the two surfaces of the first die contact different surfaces of the third die.

8. The core according to claim 6, wherein:
the second die includes two surfaces that are parallel to the skin adjacent to the second die and are different distances from the skin.

9. The core according to claim 1, wherein:
at least one of the first die and the second die are interposed between an entirety of all surfaces of the third die which face towards the skin.

10. A method of forming a structural body,
the method comprising:
inserting the core according to claim 1 into the space between the skin and the stringer;
in this state, integrally molding the skin and the stringer; and
then, pulling out the core from the space.

11. A core that is to be inserted into a space between a skin and a stringer in a step of integrally molding the skin and the stringer, the skin including fiber-reinforced resin, the stringer having a hat-shaped section that is open toward the skin,
the core comprising:
a first die that extends along a longitudinal direction of the stringer and contacts the skin;
a second die that extends along the longitudinal direction of the stringer, is adjacent to the first die, and contacts the skin;
a third die that extends along the longitudinal direction of the stringer, is located at an opposite side of the skin across the first die and the second die, and contacts both the first die and the second die; and
a fourth die that extends along the longitudinal direction of the stringer and is located at an opposite side of the first die and the second die across the third die, the fourth die including sides that extend towards at least one of the first die and the second die, and at least partially surround the third die.

12. The core according to claim 11, wherein:
the first die and the second die each include sides that extend towards the fourth die and at least partially surround the third die.

13. The core according to claim 11, wherein:
the first die, the second die, and the third die are unbonded to one another.

14. A core that is to be inserted into a space between a skin and a stringer in a step of integrally molding the skin and the stringer, the skin including fiber-reinforced resin, the stringer having a hat-shaped section that is open toward the skin,
the core comprising:
a first die that extends along a longitudinal direction of the stringer and contacts the skin;
a second die that extends along the longitudinal direction of the stringer, is adjacent to the first die, and contacts the skin;
a third die that extends along the longitudinal direction of the stringer, is located at an opposite side of the skin across the first die and the second die, and contacts both the first die and the second die,
wherein:
a side of the first die which is opposite to and parallel to a side of the first die which contacts the skin includes a portion that does not contact the third die and another portion that contacts the third die, such that the portion of the first die that that does not contact the third die is perpendicular to and forms a right angle with an edge of a side of the third die that contacts the first die and is perpendicular to the skin,
a side of the second die which is opposite to and parallel to a side of the second die which contacts the skin includes a portion that does not contact the third die and another portion that contacts the third die, such that the portion of the second die that that does not contact the third die is perpendicular to and forms a right angle with an edge of a side of the third die that contacts the second die and is perpendicular to the skin,
the first die includes two surfaces that are parallel to the skin which is adjacent to the first die and are different distances from the skin, and
the two surfaces of the first die contact different surfaces of the third die.

15. The core according to claim 14, wherein:
the first die, the second die, and the third die are unbonded to one another.

* * * * *